Figure 1:
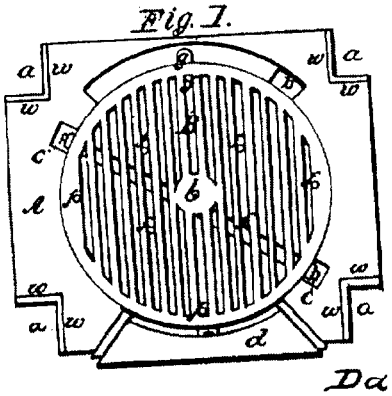
Figure 2:
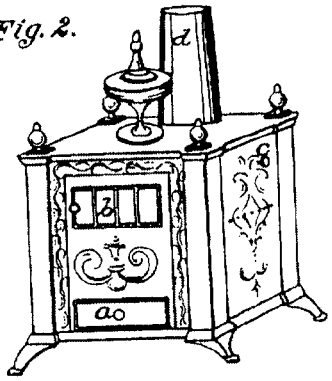
Figure 2:
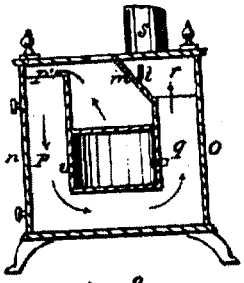
Figure 3:
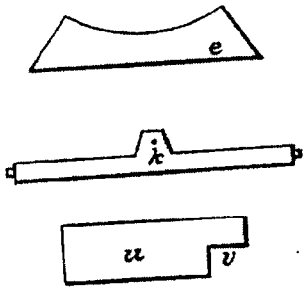

A. D. Spoor,

Grate.

RE

No. 6.

8084X

Reissued Dec. 4. 1838.

Da

UNITED STATES PATENT OFFICE.

ABRAHAM D. SPOOR, OF TROY, NEW YORK.

IMPROVED STOVE FOR BURNING ANTHRACITE AND OTHER COAL.

Specification forming part of Letters Patent dated March 15, 1834; Reissue No. 6, dated December 4, 1838.

*To all whom it may concern:*

Be it known that I, ABRAHAM D. SPOOR, late of the town of Coxsackie, county of Green, and State of New York, now of the city of Troy, New York, have invented certain Improvements in Stoves for Burning Anthracite and other Coal; and I do hereby declare that the following is a full and exact description of the construction and operation of the said stove, reference being had to the drawings which accompany and make a part of this specification.

The form in which I usually make this stove is that of a square box or right prism, as shown in the drawing No. 2. The front has two openings—one for the ash-drawer, (seen at *a*,) the other for the introduction of fuel, (seen at *b*.) The ash-drawer occupies about two-thirds of the width of the stove, the remaining width being occupied by two flues—one on each side of the ash-drawer—to be presently described. The upper opening may correspond in width with the ash-drawer; or it may be of any other dimensions which may be preferred. Its lower edge is just above the upper part of the furnace or receptacle for fuel. This opening is closed by a door consisting in general of a metallic open-work frame filled in with laminated mica. As the whole of this door is above the fuel, its ignited surface is consequently exposed to full view. The top and bottom plates of this stove are made flat, and the opening for the pipe by which the smoke is conducted off may be either in the top or back plates. Within the body of the stove are two other plates, placed horizontally. The lower one, (represented at No. 1,) containing the circular grate, is placed immediately over the ash-drawer, and as this plate is composed of two pieces and is designed for several purposes—that is, to suspend the grate, to support the non-conducting lining of the furnace, to form part of the reverberating flues, (more fully to be described hereinafter), and to form, by the union of its two parts, an inclosed avenue from the outside crust of the stove to the rim of the grate, for the insertion of the shaker to rotate the grate, and for preventing the escape of dust into the apartment—I call it the "compound bed-plate," to distinguish it from all other similar plates heretofore in use, none of which have accomplished more than one of these objects. This bed-plate fits closely against the plates which form the exterior of the stove, except at the corners, where it is notched out, as at *a a a a*. It has also a circular opening in the middle sufficiently large to allow of the tilting of the grate B, which is sustained over it. This grate is made capable of vibrating or rotating on its center to discharge the ashes deposited upon it, and it may also be tilted to discharge the coals.

The manner in which these operations are effected I will now describe. There is a part, *d*, which is sunk about an inch below the general level of the bed-plate, and into this the separate piece *c* fits closely, and is inserted after using the shaker, there being a notch or slot in one of the outer plates of the stove, generally the back plate, corresponding to this depression, and in connection with it making an avenue from the outside of the stove to the grate, and this opening in the outside plate is closed by a shutter, *e*, that exactly fits it, as above described. The grate is made flat or nearly so. The bars may be from three-quarters of an inch to an inch in width, about a quarter of an inch in thickness, and the same distance apart. There are a number of small protuberances or projecting points on the upper surface of the grates, as at *f f f f*, for the purpose of jostling or shaking the coal to discharge the ashes when the grate is vibrated or rotated; and in order to do this the shutter *e* is removed from the entrance of the avenue, and a piece of iron, which I call a "shaker" or "rotator," is introduced between two projecting pieces at *h*, which proceed from the lower surface to the rim of the grate; or, instead of these, there may be an opening or mortise in the rim of the grate to receive the end of the shaker. Moving the shaker both ways in quick succession as far as the opening will admit will effectually detach and remove the ashes from the coal. The grate is supported in part by a bar which crosses the circular opening nearly under its center. This bar is shown separately at *k*, and its ends are seen resting on the plate No. 1 at *c c*. There is a notch made in the bed plate at *b*, and a recess or sink at *b′ b′*, and a projecting piece, *g*, is received in this recess, and when the grate is turned upon its centerpin, so as to bring the projecting piece *g* over the opening *b*, the grate will tilt in consequence of the bar being behind the center of gravity. This is against the front plate of the stove, and when the ash-drawer is removed the shaker is to be inserted into a mortise or loop on the grate, by which means the piece *g* may be brought over the notch *b*, when the grate may be tilted and the coal discharged. There may be other modes adopted for suspending and rotating or tilting the grate; but as these would be mere variations of the same principle, and as I am not aware of any which should be preferred, it is not deemed necessary that I should point them out. The furnace of this stove I make circular, forming it by a lining of fire-brick or other suitable non-conductor of heat. This lining, as before observed, rests upon the bed-plate, and it is to rise above it to the height of eight or nine inches only, whatever may be the diameter of the furnace or the size of the stove, the coal being found to burn better and the ashes being more readily discharged when the column of coal does not exceed this height. The second horizontal plate in the interior of the stove before alluded to rests upon this lining, being notched out at the corners like the bed-plate, and having a circular opening in its middle of the same diameter with the furnace. This plate is designed merely to give a good and firm finish to the upper part of the furnace, and may, if preferred, be dispensed with. Besides these plates, I place another, which passes diagonally from the back to the top plate behind and over the fire. This plate is seen at *m m*, No. 3, which represents a part of the interior of the stove, as seen when one of the side plates is removed, *n* being the front and *o* the back plate. The particular use of this diagonal plate will presently appear.

A very important part of my improvement consists in what I denominate the "reverberating" or "revolving" flues, which I will now describe. The ash-drawer, I have said, occupies about two-thirds of the width of the stove, and there is consequently a space between each of its sides and the side plates of the stove. These spaces, by means of partitions on each side of the ash-drawer reaching from the front to the back plate, are made to form a part of the said reverberating flues, the width of the flues being equal to that of the notches *a a* in the bed-plate A, which rests upon these partitions, one of which is shown separately at *u*. The anterior and lower angles of those partitions are notched out, as shown *v*, to make an opening into the lower part of the reverberating flues for clearing out any dust or ashes that may collect in them, and these notches are closed when the stove is in use by separate pieces that exactly fit them. When the bed-plate has been put into its place, angular pieces adapted to the notches at its corners are placed thereon, resting at *w w*, and forming, with the outside plates of the stove, quadrangular vertical flues at each corner. By the removal of the side plate, No. 3 exhibits the location and operation of these flues. The front flue, *p*, terminates at some distance above the furnace, as at *p'*, but does not reach the top plate. The back flue, *q*, extends through the diagonal plate *m*, and opens into the smoke-chamber *r*, from which proceeds the smoke-pipe *s*. It is now evident that the draft will be in the direction indicated by the arrows, and that the lower part of the stove will become heated by the passage of the heated air from the fuel in contact with it, and what has hitherto been a desideratum—the diffusion of heat from the lower part of a stove lined with non-conducting material—is fully attained, while it is also economized by its distribution from flues within the interior of the stove instead of from smoke-pipes exterior to it, as has heretofore been done. As there would be some inconvenience in carrying the draft through the reverberating flues during the time of igniting the fire, I make an opening in the diagonal plate *m*, No. 3, which I call the "direct" passage, through which the smoke may pass directly from the fire, which opening is furnished with a valve or shutter, *t*, which may be closed as soon as the fire is properly lighted. A handle for this purpose may pass out through one of the side plates, as at *c*, No. 2.

The advantages obtained by this arrangement are a great saving of expense in the construction and increase of durability of the stove, as well as economy of fuel and labor in the use of it, for as the fuel does not come in contact with the external plates, and the surface of this stove is large in proportion to other stoves intended to consume the same quantity of fuel, no part of its external surface is made so intensely hot as to become oxidated, warped, or cracked, while at the same time the heat communicated to the air of the apartment is milder and much more agreeable to the sensation, less liable to crack and warp furniture or char the floating particles of combustible matter and cover the walls and furniture with a black dust, and, moreover, the fire can be better adapted to the state of the weather, as coal will burn in a mass of only two or three inches thickness.

In the foregoing description I have made known the manner in which I construct my stove, and in so doing have necessarily included many things of which I do not claim to be the inventor. I therefore now proceed to state specifically in what my improvements consist, and they are as follows:

I claim as my invention and improvement—

1. The combination of the several parts of what I have above denominated a "compound" bed-plate, so constructed as to form an inclosed avenue from the outside crust of the stove to the rim of the grate, and to accomplish the other objects stated in the description.

2. The combination of said compound bed-plate with a flat circular grate formed as above described, and made to rotate and tilt as above described, and for the use and purposes aforesaid.

3. The combination of the above-described internal reverberating flues occupying the four interior angles of the stove, with the direct passage into the smoke-pipe, and with the compound bed-plate and grate aforesaid.

A. D. SPOOR.

Witnesses:

F. ADANCOURT,

C. L. ADANCOURT.